US008201161B2

(12) United States Patent  (10) Patent No.: US 8,201,161 B2
Challener et al.  (45) Date of Patent: *Jun. 12, 2012

(54) SYSTEM AND METHOD TO UPDATE DEVICE DRIVER OR FIRMWARE USING A HYPERVISOR ENVIRONMENT WITHOUT SYSTEM SHUTDOWN

(75) Inventors: David Carroll Challener, Raleigh, NC (US); Mark Charles Davis, Durham, NC (US); Randall Scott Springfield, Chapel Hill, NC (US); Rod David Waltermann, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1069 days.

This patent is subject to a terminal disclaimer.

(21) Appl. No.: 11/970,038

(22) Filed: Jan. 7, 2008

(65) Prior Publication Data

US 2009/0178033 A1 Jul. 9, 2009

(51) Int. Cl.
*G06F 9/445* (2006.01)
(52) U.S. Cl. ............ 717/168; 718/1; 717/169; 717/170; 717/171; 717/172; 717/173
(58) Field of Classification Search .................. 717/168, 717/169–173; 710/8–10; 718/1
See application file for complete search history.

(56) References Cited

U.S. PATENT DOCUMENTS

| 6,834,340 | B2 | 12/2004 | Lee et al. | 713/100 |
|---|---|---|---|---|
| 7,069,452 | B1 * | 6/2006 | Hind et al. | 713/1 |
| 7,082,598 | B1 * | 7/2006 | Le et al. | 717/127 |
| 2002/0124166 | A1 * | 9/2002 | Lee et al. | 713/100 |
| 2004/0103299 | A1 | 5/2004 | Zimmer et al. | 726/26 |
| 2004/0205776 | A1 | 10/2004 | Harrington et al. | 719/320 |
| 2004/0243994 | A1 * | 12/2004 | Nasu | 717/171 |
| 2005/0076155 | A1 * | 4/2005 | Lowell | 710/1 |
| 2005/0076156 | A1 * | 4/2005 | Lowell | 710/1 |
| 2005/0144613 | A1 | 6/2005 | Tseng | 717/168 |
| 2005/0283640 | A1 | 12/2005 | Cheston et al. | 714/38.13 |
| 2007/0011444 | A1 | 1/2007 | Grobman et al. | 713/2 |
| 2007/0074199 | A1 * | 3/2007 | Schoenberg | 717/168 |
| 2007/0245334 | A1 * | 10/2007 | Nieh et al. | 717/168 |
| 2008/0189697 | A1 * | 8/2008 | Kachroo et al. | 717/171 |
| 2008/0244553 | A1 * | 10/2008 | Cromer et al. | 717/168 |

FOREIGN PATENT DOCUMENTS

| GB | 2 421 612 | 6/2006 |
|---|---|---|
| JP | 10-003384 | 1/1998 |
| JP | 2001-092668 | 4/2001 |

(Continued)

*Primary Examiner* — Li Zhen
*Assistant Examiner* — V Miller
(74) *Attorney, Agent, or Firm* — VanLeeuwen & VanLeeuwen; Carlos Munoz-Bustamante

(57) ABSTRACT

A system, method, and program product is provided that has a virtualized environment provided by a hypervisor. In the virtualized environment, one or more guest operating systems operate simultaneously with a privileged operating system. One of the guest operating systems identifies a device software update, such as a device driver or firmware update, corresponding to a hardware device that is attached to the computer system. The hypervisor is used to notify the privileged operating system of the device software update. When the privileged operating system is notified of the update, the privileged operating system uses one or more techniques to deny the guest operating systems access to the device. The privileged operating system then updates the device software update. After the device software update has been applied, the privileged operating system resumes access between the guest operating systems and the hardware device.

20 Claims, 10 Drawing Sheets

FOREIGN PATENT DOCUMENTS

| | | |
|---|---|---|
| JP | 2001-290637 | 10/2001 |
| JP | 2002-244874 | 8/2002 |
| JP | 2002-268900 | 9/2002 |
| JP | 2006-185063 | 7/2006 |
| JP | 2006-216047 | 8/2006 |
| JP | 2006-277216 | 10/2006 |
| WO | WO2004/077292 | 9/2004 |

\* cited by examiner

SYSTEM AND METHOD TO UPDATE DEVICE DRIVER OR FIRMWARE USING A HYPERVISOR ENVIRONMENT WITHOUT SYSTEM SHUTDOWN

BACKGROUND OF THE INVENTION

1. Technical Field

The present invention relates to a system and method that controls access to peripheral devices. More particularly, the present invention relates to a system and method that shares a secret between the peripheral device and a computer system to protect usage of the peripheral device.

2. Description of the Related Art

Computer virtualization software is an increasingly popular method of running multiple operating systems on a single computer system. There are many benefits of virtualization. These benefits include allowing an organization to consolidate computer systems (e.g. servers) and increase the scale of the server infrastructure without having to purchase additional hardware. Reducing the number of physical computer system machines that an organization needs leads to improved energy conservation and may lower an organization's utility bills. Virtualization also improves the management of machines as it is generally easier to manage one physical machine that is hosting multiple operating systems instead of multiple physical machines, each hosting a different operating system. Backup and recovery times can also be reduced in a virtualized environment. Virtualization also aids in testing software configurations, maintaining legacy software applications, and reducing the amount of physical space needed to house the organization's physical computer systems. While virtualization provides many benefits, it also presents new challenges to the organization, especially with regard to firmware and device driver updates.

Computer peripheral devices utilize firmware to operate. For example, a DVD-player uses firmware stored in its Read-Only-Memory (ROM) to read a CD or DVD. To access devices under an operating system, such as Microsoft Windows™ or Linux™, software called a device driver" is used to use (control) the device. The device driver is installed in the operating system and includes instructions that allow the operating system to use and control the device. Using the DVD-player example, the device driver allows the operating system to control the DVD-player in order to play a movie or write/read files from/to the device. From time-to-time the firmware and device drivers for a device may need to be updated for a variety of reasons, such as correcting a bug in the firmware or device driver, improving the efficiency or use of the device, addressing a security vulnerability discovered with the device, or many other reasons.

One challenge in virtualization is managing these device drivers and firmware. This challenge is due to the fact that, when using virtualization software, the operating systems do not access the physical hardware and therefore do not readily recognize when updates to the device driver or firmware are needed. Traditional methods of updating firmware and/or a device driver often require a re-boot or a shutdown of the computer system before the update becomes effective. Because multiple operating systems run on a common computer system in a virtualized environment, a shutdown or re-boot of the computer system impacts each of the operating systems that is being hosted. This is another challenge encountered when managing a virtualized computing environment.

SUMMARY

It has been discovered that the aforementioned challenges are resolved using a system, method and computer program product that has a virtualized environment provided by a hypervisor. In the virtualized environment, one or more guest operating systems operate simultaneously with a privileged operating system. One of the guest operating systems identifies a device software update, such as a device driver or firmware update, corresponding to a hardware device that is attached to the computer system. The hypervisor is used to notify the privileged operating system of the device software update. When the privileged operating system is notified of the update, the privileged operating system uses one or more techniques to deny the guest operating systems access to the device. The privileged operating system then updates the device software update. After the device software update has been applied, the privileged operating system resumes access between the guest operating systems and the hardware device.

In one embodiment, the privileged operating system verifies the legitimacy of the device software update. In this embodiment, the device software update is only applied when it is successfully verified. In a further embodiment, the verification of the device software update is performed by comparing a digital signature of the device software update with a pre-established digital signature.

In one embodiment, denying the guest operating systems access to the device is performed by identifying one or more guest operating system denial methods that correspond to each of the guest operating systems. These denial methods include initiating a hot unplug of the device, forcing a suspension of one or more of the guest operating systems, stalling at least one of the guest operating systems, and caching requests to the hardware device from at least one of the guest operating systems.

In another embodiment, after access to the device has been denied, the device is taken offline. In this embodiment, the device is restarted before resuming the guest operating systems' access to the device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
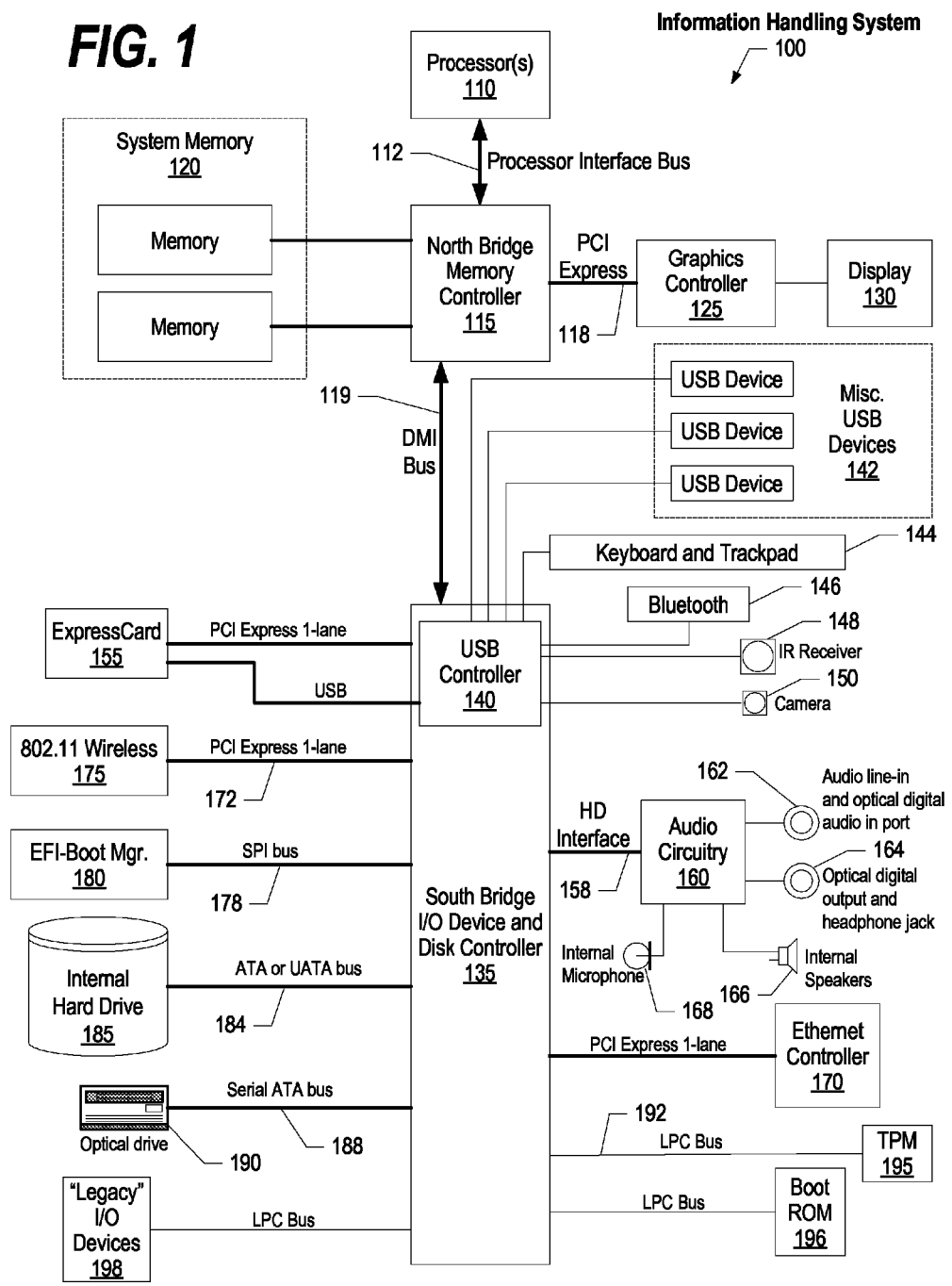
FIG. 1 is a block diagram of a data processing system in which the methods described herein can be implemented.
Figure 2:
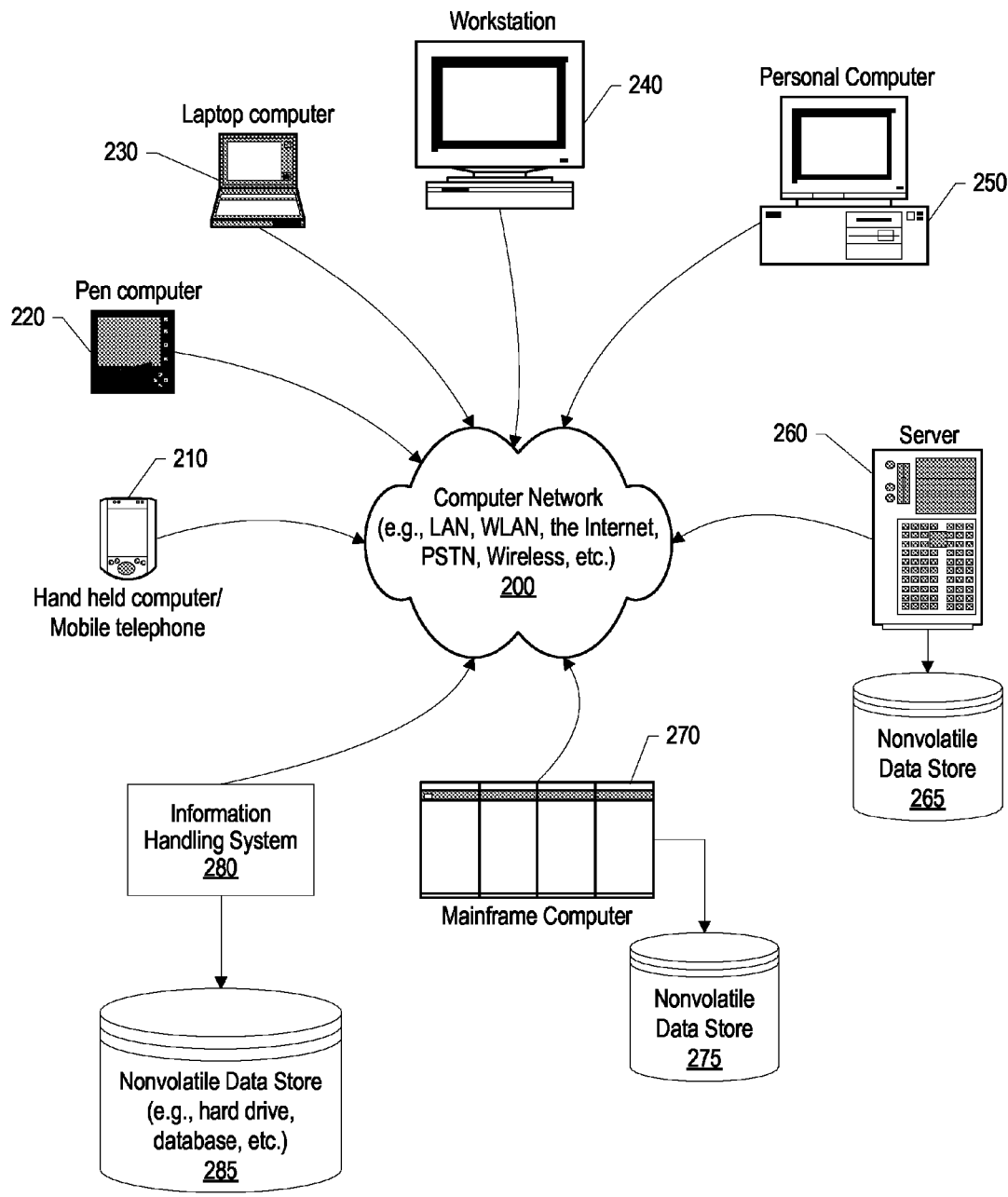
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
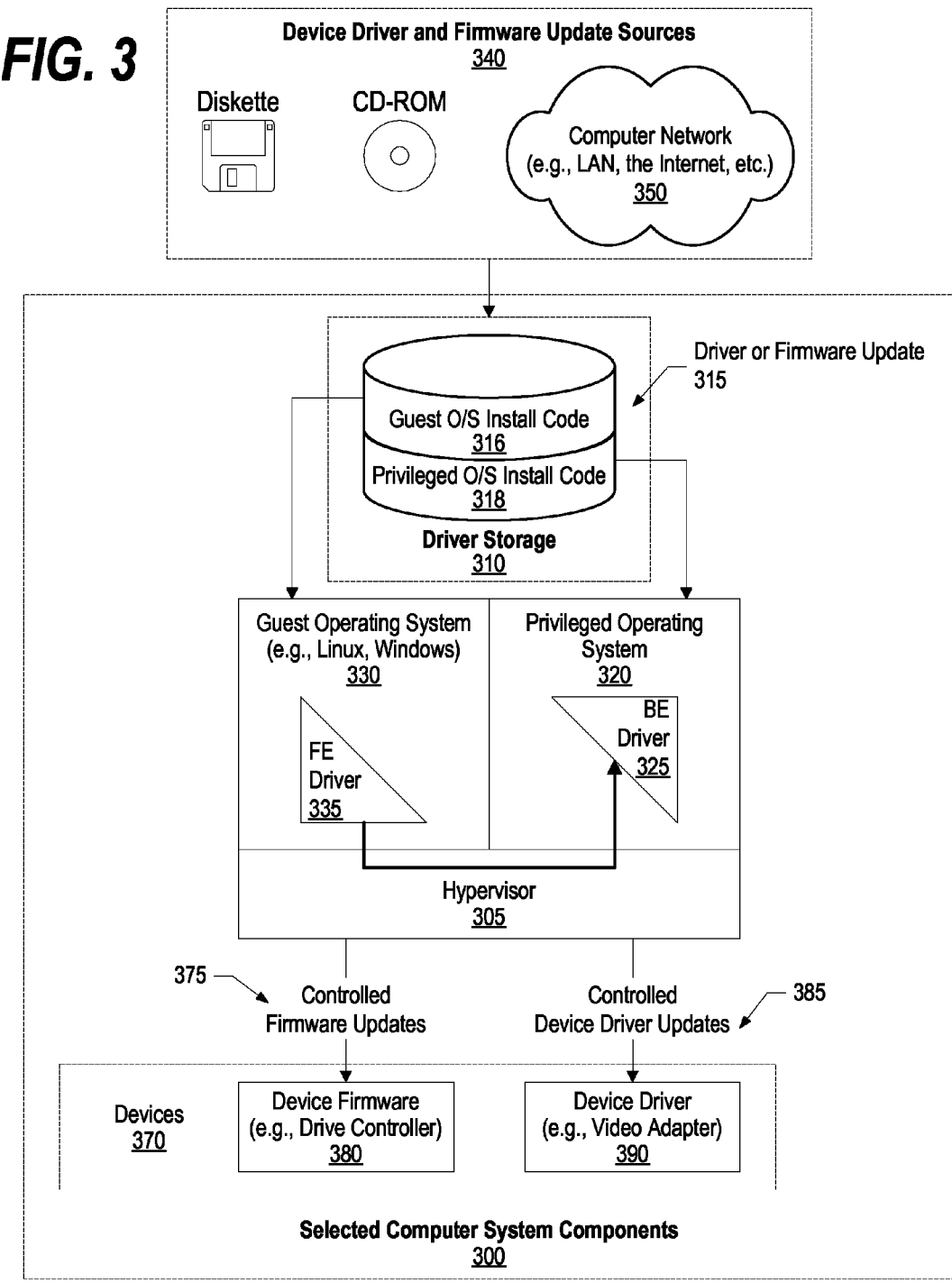
FIG. 3 is a component diagram showing the various components used in updating a driver or firmware using a hypervisor.

FIG. 3 is a component diagram showing the various components used in updating a driver or firmware using a hypervisor. Selected computer system components 300 include driver storage 310 which stores both guest operating system installation code 316 that is used to update device software from a guest operating system as well as privileged operating system installation code 318 that is used to update device software from a privileged operating system. Device software update 315 is software used to update a device driver and/or a device firmware.

Running in the computer system are one or more guest operating systems 330, such as a Linux™ operating system, a Microsoft Windows™ operating system, or the like. Also running in the computer system is privileged operating system 320. As shown, hypervisor software application 305 provides a virtualized environment where multiple guest operating systems can execute simultaneously along with a privileged operating system. In one embodiment, the privileged operating system operates in the hypervisor partition, while in another embodiment the hypervisor provides communication between the guest operating systems and the privileged operating system. Also, in one embodiment, the guest operating systems operate front-end driver 335 used to communicate with the device and the privileged operating system operates back-end driver 325 with hypervisor 305 providing a communications path between the front-end and back-end drivers.

As shown, the device software updates can be received from a variety of sources 340. These sources include diskettes, CD-ROMs, and other portable nonvolatile-media as well as device software updates downloaded from computer network 350, such as the Internet.

Privileged operating system 320, either running separately from hypervisor 305 or running within the hypervisor, controls the device software updates, including controlled firmware updates 375 and controlled device driver update 385. Devices 370 are attached to the computer system in a variety of ways, either directly attached to the computer system motherboard or attached using any number of interfaces, such as USB, serial port, parallel port, or the like. Devices include such things as video cards, printers, drive controllers, and any number of devices known by those skilled in the art. Device firmware 380 and device driver 390 are updated with various device software updates with device firmware 380 generally controlling how a device operates and device driver 390 generally controlling access to the device from one or more of the guest operating systems.

Figure 4:
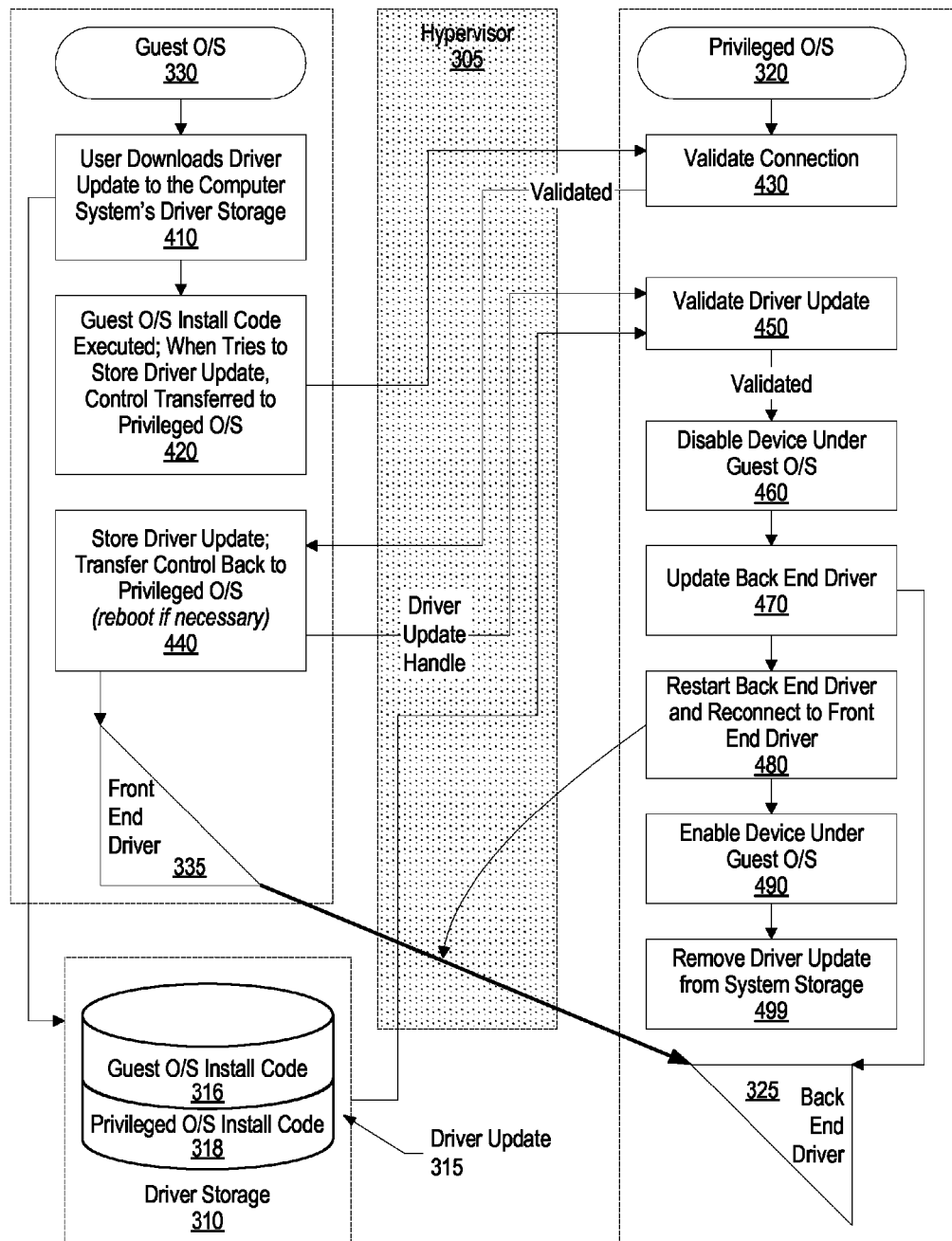
FIG. 4 is a flowchart showing steps performed between a guest operating system, a hypervisor, and a privileged operating system to update a driver.

FIG. 4 is a flowchart showing steps performed between a guest operating system, a hypervisor, and a privileged operating system to update device software, such as a device driver. Guest operating system processing is shown commencing at 330 whereupon, at step 410, a user of the guest operating system downloads a device software update, such as a device driver, and stores the device software update on nonvolatile storage, such as a hard drive, that is accessible by the computer system. At step 420, the guest operating system installation code is executed in order to install the device software update. At some point during execution of the guest operating system installation code, the code attempts to store the device software update. At this point, control is transferred to the privileged operating system.

Privileged operating system processing is shown commencing at 320 with hypervisor 305 providing communication between guest operating system processing 330 and privileged operating system processing 320. As previously mentioned, the privileged operating system can be executed directly by the hypervisor or as a separate operating system running in the virtualized environment that is provided by the hypervisor. At step 430, the connection between the guest operating system and the privileged operating system is validated. If the connection is successfully validated control is transferred back to the guest operating system processing, otherwise device software update processing terminates if the connection is not successfully validated.

Returning to guest operating system processing, if the connection is successfully updated then, at step 440, the guest operating system stores the update to the front-end device driver 335. A generic front-end driver 335 is installed in the guest operating system, such as Microsoft Windows™. Being a generic front-end, the front-end software likely will have few updates. However, front-end driver 335 presents an identifier to the guest operating system that supports multiple device drivers corresponding to selected hardware attached to the computer system. The identifier of the selected device driver (device update handle) is passed back to the privileged operating system and control is passed back to the privileged operating system for actually updating the device driver.

Figure 7:
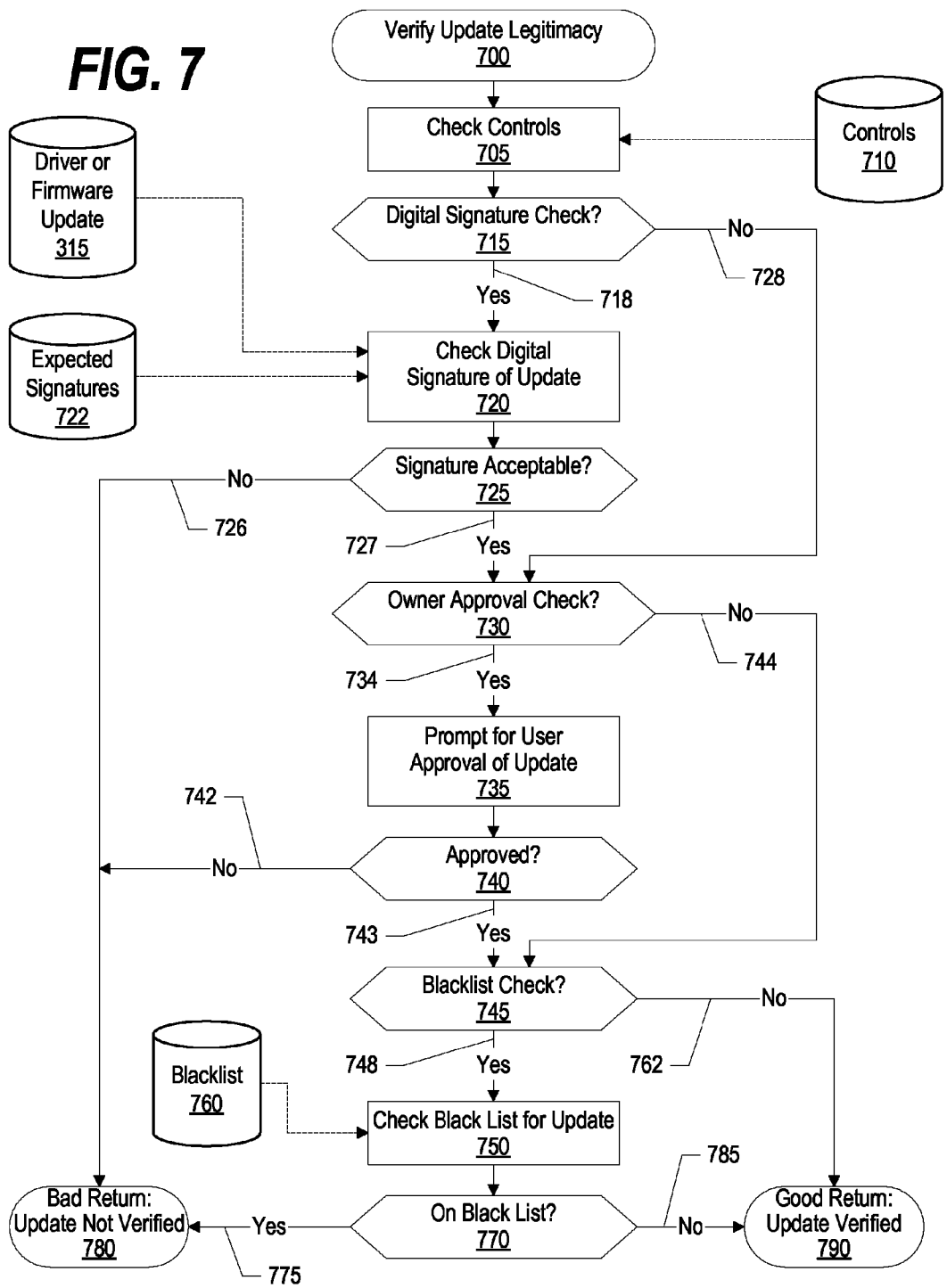
FIG. 7 is a flowchart showing steps taken verify the legitimacy of a driver or firmware update.

Returning to privileged operating system processing, at step 450, the privileged operating system validates the device software update corresponding to the driver update handle that was sent by the guest operating system (see FIG. 7 and corresponding text for various techniques of validating a device software update). If the device software update is not validated, processing terminates without updating the device driver. However, if the device software update is validated, then, at step 460, the device is disabled by the privileged operating system. At step 470, back-end device driver 325 is updated. At step 480, updated back-end device driver 325 is restarted and reconnected to front-end device driver 335. At step 490, the device is enabled under the guest operating system, and at step 499 the device software update is removed from driver storage 310 since it has been applied to the device and the guest operating system.

Figure 5:
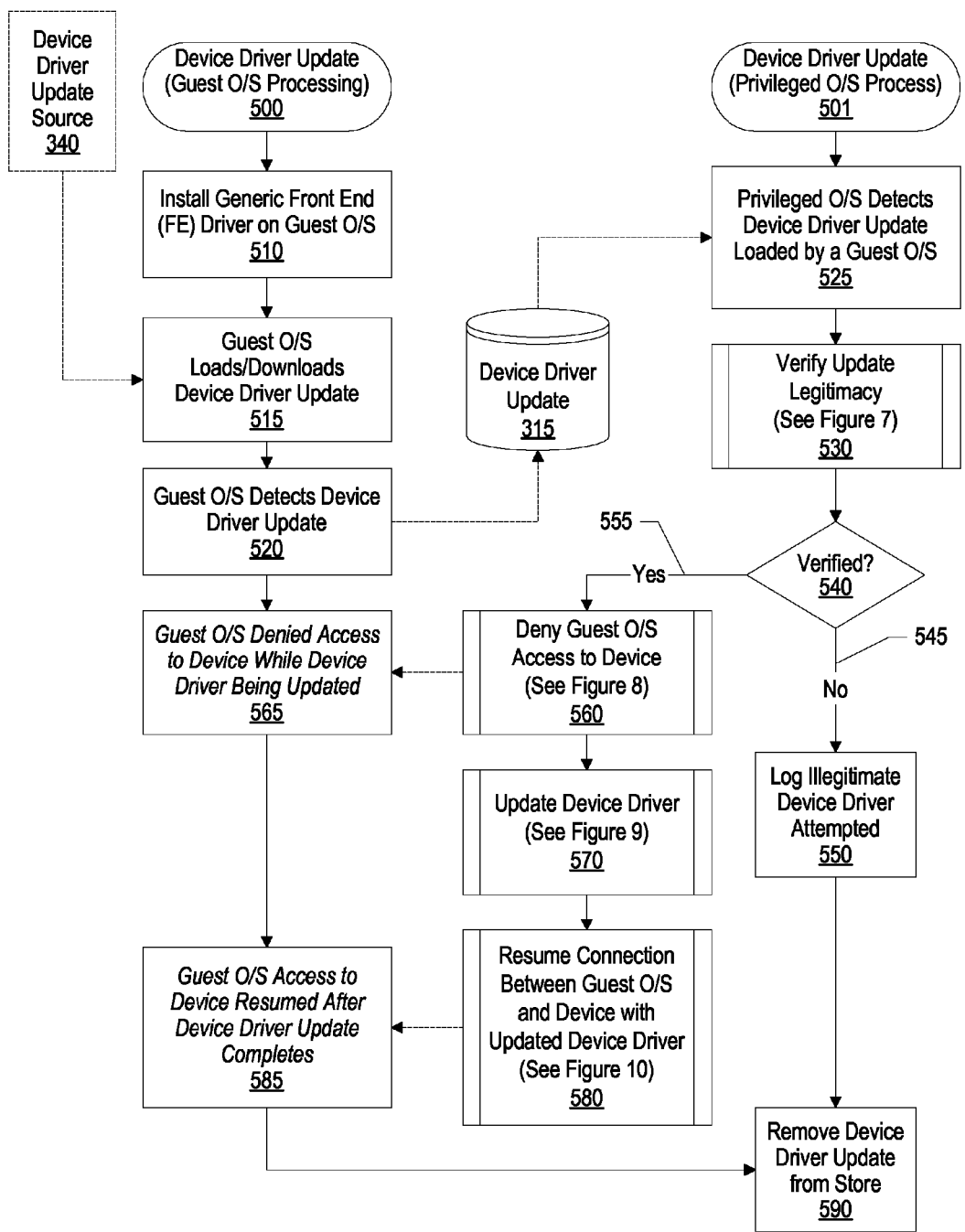
FIG. 5 is a flowchart showing steps performed by the guest operating system and the privileged operating system to update a device driver.

FIG. 5 is a flowchart showing steps performed by the guest operating system and the privileged operating system to update a device driver. Guest operating system processing of a device software update, such as a device driver update, is shown commencing at 500. At step 510, a generic front-end (FE) driver is installed on the guest operating system. As the name implies, in one embodiment, the generic front-end driver is used to coordinate updates of any number of device drivers (back-end device drivers) with the privileged operating system process that is shown commencing at step 501.

Returning to guest operating system processing, at step 515, the guest operating system loads or downloads a device software update from device software update source 340. Various examples of update sources are shown in FIG. 3. At step 520, the guest operating system detects a device software update, such as a device driver update, and stores the update in device software update data store 315 (e.g., a nonvolatile data store accessible by both the guest operating system and the privileged operating system, a RAM storage location accessible by both the guest operating system and the privileged operating system, etc.).

Privileged operating system processing is shown commencing at step 501. At step 525, the privileged operating system detects a device software update that has been loaded into data store 315. At predefined process 530, the legitimacy of the device software update is verified using a variety of techniques (see FIG. 7 and corresponding text for processing details). A determination is made as to whether the device software update is successfully verified (decision 540). If the device software update is not successfully verified, then decision 540 branches to "no" branch 545 whereupon, at step 550, the privileged operating system logs that an attempt was made to install an illegitimate (i.e., unapproved, etc.) device software update and the illegitimate device software update is removed from data store 315 at step 590. Returning to decision 540, if the legitimacy of the device software update is successfully verified, then decision 540 branches to "yes" branch 555 whereupon, at predefined process 560, the guest operating system is denied access to the device so that the device can be updated without causing problems with a guest operating system that is trying to use the device (see FIG. 8 and corresponding text for processing details). Step 565 of guest operating system processing shows that the guest operating system is denied access to the device at this point. At predefined process 570, the device software update is updated (see FIG. 9 and corresponding text for processing details). At predefined process 580, the privileged operating system resumes the connection between the guest operating system and the device. Step 585 of guest operating system processing shows that the guest operating system can now access the device using the newly updated device software update (e.g., device driver). Finally, having been successfully installed, at step 590 the device software update is removed from device software update data store 315.

Figure 6:
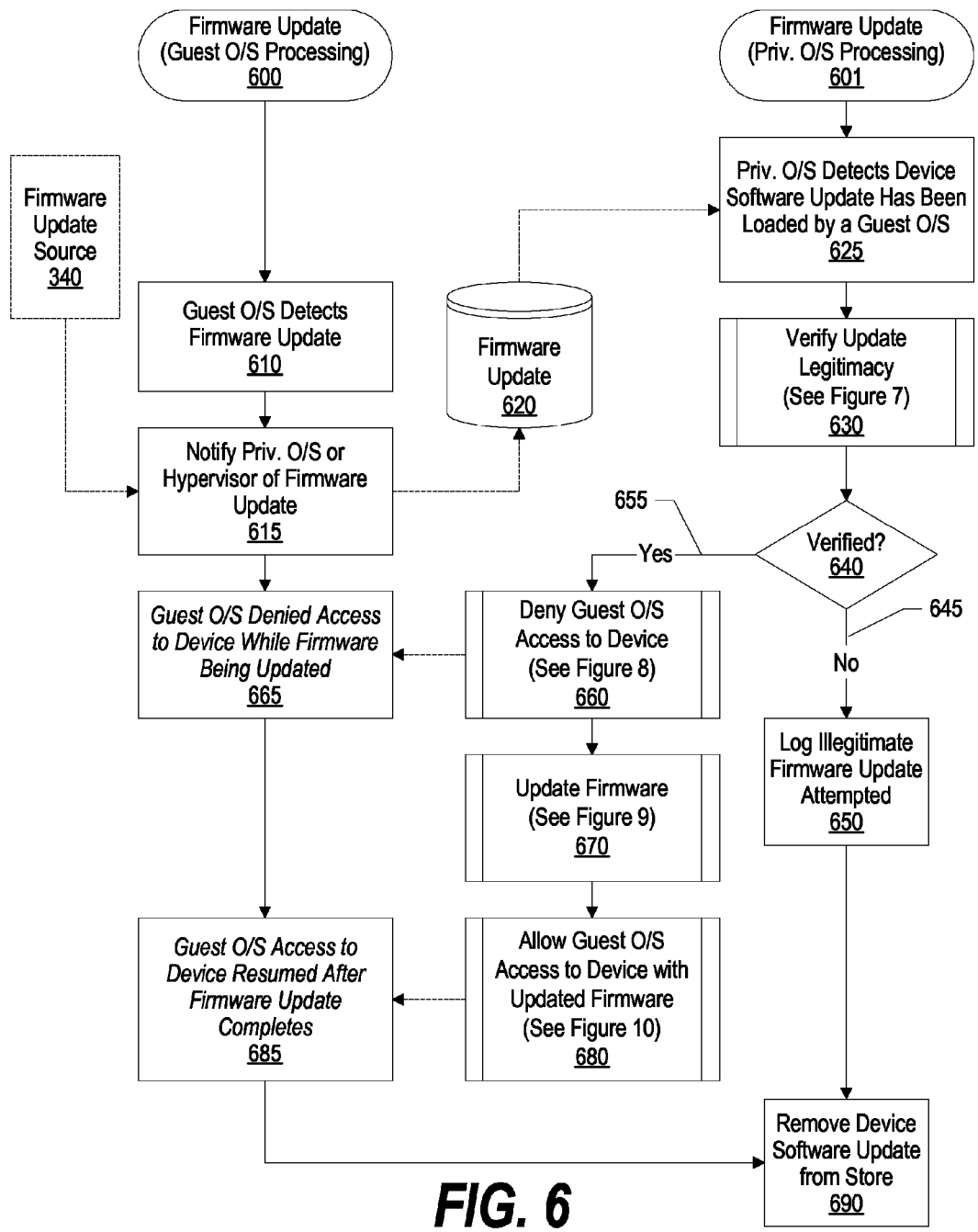
FIG. 6 is a flowchart showing steps performed by the guest operating system and the privileged operating system to update a firmware.

FIG. 6 is a flowchart showing steps performed by the guest operating system and the privileged operating system to update a device software update such as a firmware. Guest operating system processing commences at 600 whereupon, at step 610 the guest operating system detects that a device software update (e.g., firmware) is available for a device. At step 615, the guest operating system retrieves the device software update from source 340 (e.g., a removable nonvolatile media, a computer network, etc.), stores the retrieved update in data store 620, notifying the privileged operating system of the update.

Privileged operating system processing commences at 601 whereupon, at step 625, the privileged operating system detects that a device software update has been loaded by the guest operating system into nonvolatile data store 620. At predefined process 630 the privileged operating system verifies the legitimacy of the device software update, such as a firmware update (see FIG. 7 and corresponding text for processing details). A determination is made as to whether the legitimacy of the device software update is successfully verified (decision 640). If the device software update is not successfully verified, then decision 640 branches to "no" branch 645 whereupon, at step 650, a log is made of the unauthorized attempt to update the device software update, such as the firmware, and the device software update is removed from nonvolatile data store 620 at step 690. On the other hand, if the legitimacy of the device software update is verified, then decision 640 branches to "yes" branch 655 whereupon, at predefined process 660, the guest operating system is denied access to the device (see FIG. 8 and corresponding text for processing details). Guest operating system processing is denied access to the device while the device software update is being updated at step 665. At step 670, the privileged operating system updates the device software update, such as the firmware (see FIG. 9 and corresponding text for processing details). At predefined process 680, after the device software update has been updated, the privileged operating system allows the guest operating system to access the device that now has updated software, such as firmware. Guest operating system processing is shown having renewed access to the device at step 685 with the device now having updated software. Finally, after the device software update is complete, the device software update is removed from nonvolatile data store 620 at step 690.

FIG. 7 is a flowchart showing various steps taken verify the legitimacy of a device software update, such as an update to a device driver or firmware. Processing commences at 700 whereupon, at step 705, a check is made of the controls 710 that are being used by the computer system. These controls may be implemented on a system-by-system basis or on an organizational basis with all computer systems within an organization using the same legitimacy controls. A determination is made as to whether a digital signature check is part of the controls (decision 715). If a digital signature check is a control that is being used, then decision 715 branches to "yes" branch 718 whereupon, at step 720 a digital signature is calculated by processing device software update 315 with an algorithm, such as SHA-256, that results in a value. This value is compared with an expected digital signature retrieved from data store 722. A determination (decision 725) is made as to whether the digital signature is correct (i.e., whether the calculated value matches or corresponds correctly to an expected signature retrieved from data store 722). If the digital signature is not correct, then decision 725 branches to "no" branch 726 which results in the device software update being flagged as an illegitimate update (bad return 780). On the other hand, if the digital signature is correct, then decision 725 branches to "yes" branch 727 for further processing. Returning to decision 715, if digital signature checking is not one of the controls being used, then decision 715 branches to "no" branch 728 bypassing the digital signature checking steps.

A determination is made as to whether one of the controls is for the owner (e.g., system administrator, user, etc.) of the computer system to approve of the device software update before applying the update (decision 730). If one of the controls is for owner approval, then decision 730 branches to "yes" branch 734 whereupon, at step 735, the owner is prompted (e.g., using a pop-up dialog message box, etc.) for approval of the device software update. A determination is then made as to whether the owner approved the update (decision 740). If the owner did not approve the update, then decision 740 branches to "no" branch 742 which results in the device software update being flagged as an illegitimate update (bad return 780). On the other hand, if the owner approved the device software update then decision 740 branches to "yes" branch 743 for further processing. Returning to decision 730, if owner approval is not one of the controls being used, then decision 730 branches to "no" branch 744 bypassing the owner approval steps.

A determination is made as to whether a blacklist control has been implemented in controls 710 (decision 745). A blacklist is a control of device software update that are banned from the computer system. For example, if a particular device software update contains bugs, errors, viruses, or other problems, the identifier of the particular device software update (digital signature, file identifier, etc.) can be written to blacklist data store 760. If blacklist checking is being used as determined by controls 710, then decision 745 branches to "yes" branch 748 whereupon, at step 750, the device software update is compared to entries included in blacklist 760. A determination is made as to whether the device software update is included in blacklist 760 (decision 770). If the device software update is included in blacklist 760, then decision 770 branches to "yes" branch 775 which results in the device software update being flagged as an illegitimate update (bad return 780). On the other hand, if the device software update is not included in blacklist 760, then decision 770 branches to "no" branch 785 which results in the device software update being flagged as legitimate (good return 790). Likewise, returning to decision 745, if blacklist checking is not being used, then decision 745 branches to "no" branch 762 bypassing the blacklist checking steps and the device software update is flagged as legitimate (good return 790).

As will be appreciated by those skilled in the art other controls such as white lists, grey lists, and the like can also be implemented in order to verify the legitimacy of a device software update. These additional legitimacy checks can also be performed before returning either the bad return (return 780) or the good return (return 790) to the calling routine.

Figure 8:
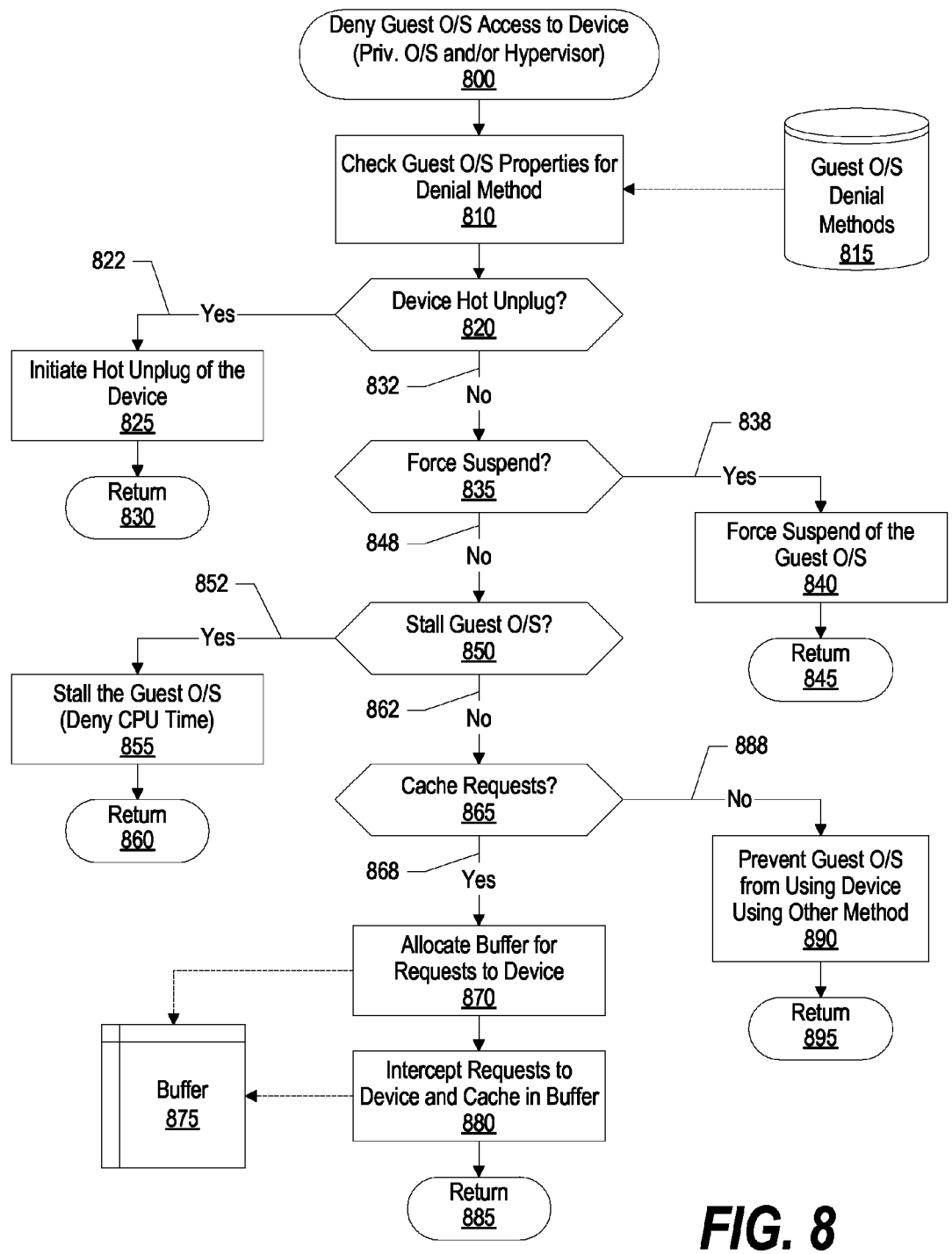
FIG. 8 is a flowchart showing steps performed by the privileged operating system or the hypervisor to deny a guest operating system's access to a device that is being updated.

FIG. 8 is a flowchart showing steps performed by the privileged operating system or the hypervisor to deny a guest operating system's access to a device that is being updated. Processing commences at 800 whereupon, at step 810, a check is made of the properties associated with a particular guest operating system. The properties (e.g., operating system name, operating system version, etc.) associated with a guest operating system are compared to a list of available denial methods (data store 815) in order to determine one or more denial techniques to use in order to make the device inaccessible from the guest operating system while the device software update is being applied.

A determination is made as to whether the operating system and device support a hot unplug of the device (decision 820). If a hot unplug of the device is an appropriate denial technique, then decision 820 branches to "yes" branch 822 whereupon, at step 825, a hot unplug of the device is initiated and processing returns at 830. Returning to decision 820, if a hot unplug of the device is either not an appropriate denial technique or if a previous hot unplug was previously attempted unsuccessfully, then decision 820 branches to "no" branch 832 for further processing of denial techniques.

A determination is made as to whether a forced suspension of the guest operating system is an appropriate denial technique to use for the guest operating system (decision 835). If a forced suspension is an appropriate denial technique, then decision 835 branches to "yes" branch 838 whereupon, at step 840, a forced suspension of the guest operating system is initiated and processing returns at 845. Returning to decision 835, if a forced suspension of the guest operating system is either not an appropriate denial technique or if a previous forced suspension of the guest operating system was previously attempted unsuccessfully, then decision 835 branches to "no" branch 848 for further processing of denial techniques.

A determination is made as to whether stalling the guest operating system is an appropriate denial technique to use (decision 850). If stalling the guest operating system is an appropriate denial technique, then decision 850 branches to "yes" branch 852 whereupon, at step 855, the guest operating system is stalled by denying the guest operating system CPU time and processing returns at 860. Returning to decision 850, if stalling the guest operating system is not an appropriate denial technique, then decision 850 branches to "no" branch 862 for further processing of denial techniques.

A determination is made as to whether caching requests from the guest operating system to the device is an appropriate denial technique to use (decision 865). If caching requests is an appropriate denial technique to use, then decision 865 branches to "yes" branch 868 whereupon, at step 870, a buffer (buffer 875) is allocated by the privileged operating system or the hypervisor. At step 880, the privileged operating system or hypervisor begins intercepting requests from the guest operating system to the device and caching the requests in buffer 875. Processing then returns at 885. Returning to decision 865, if caching requests from the guest operating system is not an appropriate denial technique, then decision 865 branches to "no" branch 888 whereupon, at step 890, the guest operating system is prevented from using the device using some other technique that is deemed appropriate for the guest operating system and the device. Processing then returns at 895.

Figure 9:
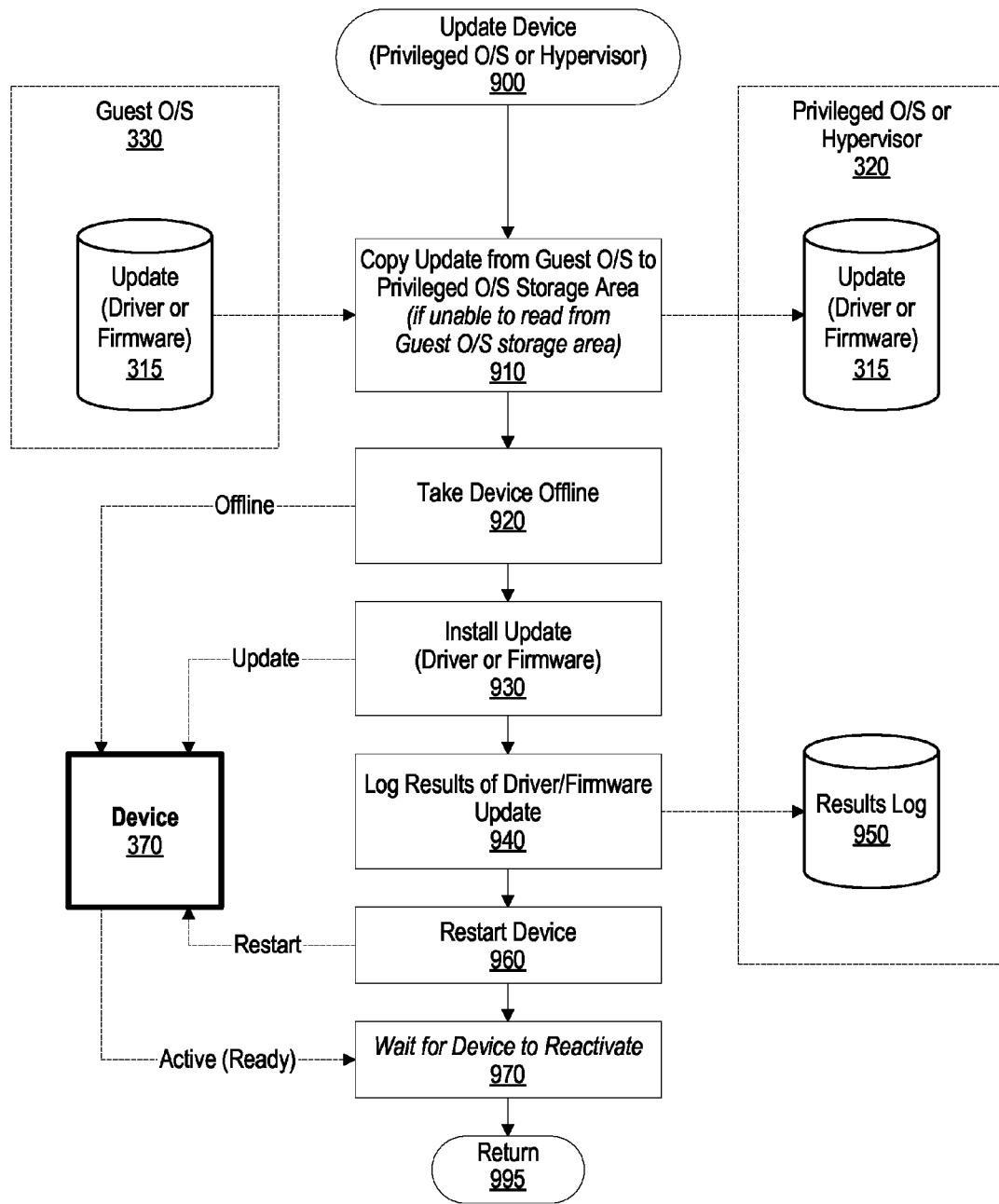
FIG. 9 is a flowchart showing steps performed by the privileged operating system or the hypervisor to update a device.

FIG. 9 is a flowchart showing steps performed by the privileged operating system or the hypervisor to update a device. Processing performed by the privileged operating system or the hypervisor is shown commencing at 900. At step 910, the device software update is copied from the guest operating system storage 330 to the privileged operating system or hypervisor storage 320. At step 920, if possible, the device (device 370) is taken offline. At step 930, the device software update is applied to the device (e.g., updated firmware, updated device driver, etc.). At step 940, an entry is written to results log 950 of the update to the device software. At step 960, the device is restarted and, at step 970, the privileged operating system or hypervisor waits for the device to restart before resuming guest operating system usage of the device. Processing then returns to the calling routine at 995.

Figure 10:
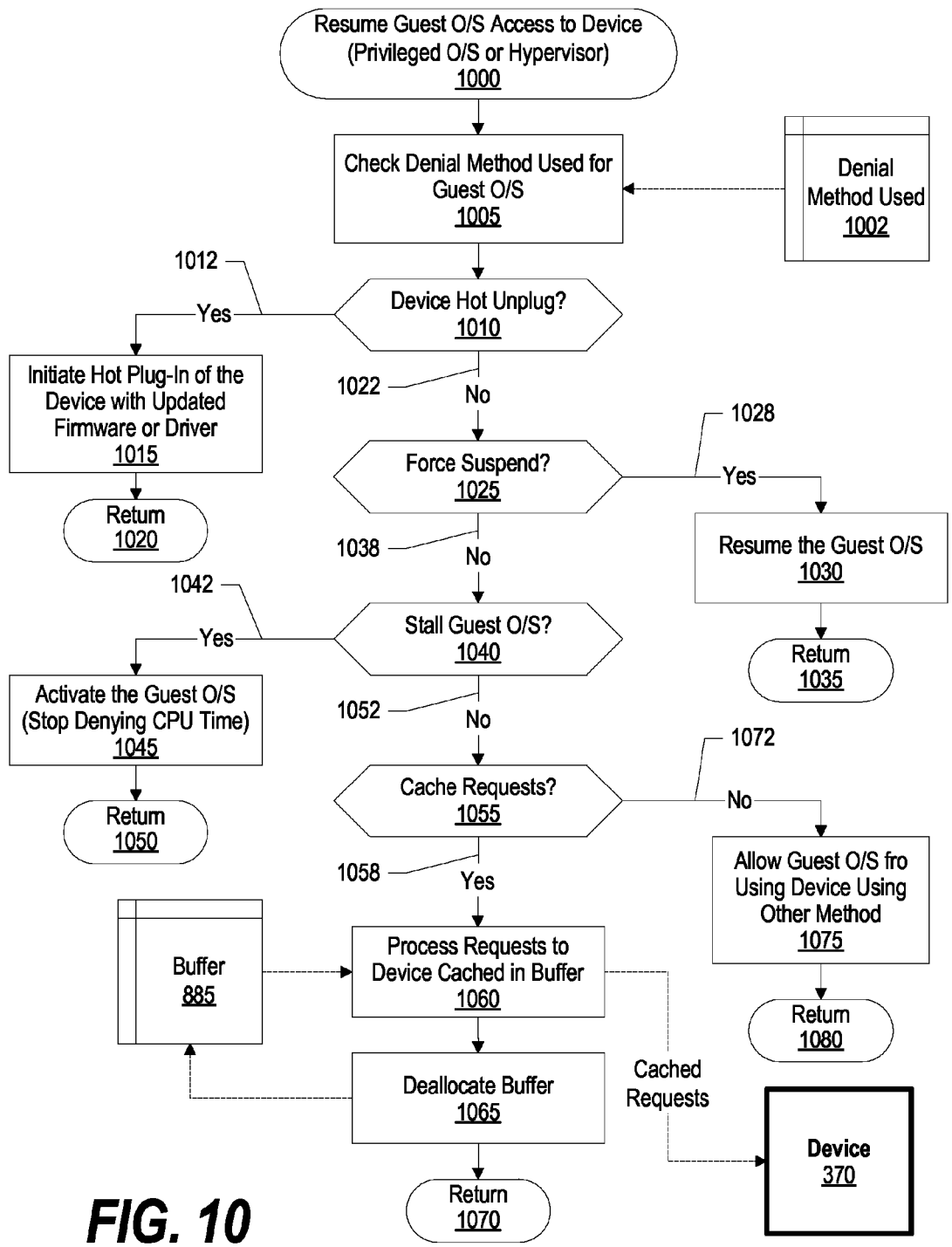
FIG. 10 is a flowchart showing steps performed by the privileged operating system or the hypervisor to resume the guest operating system's access to the device after the device has been updated.

FIG. 10 is a flowchart showing steps performed by the privileged operating system or the hypervisor to resume the guest operating system's access to the device after the device has been updated. Processing performed by the privileged operating system or hypervisor commences at 1000 whereupon, at step 1005, a check is made of the denial technique that was used to deny access to the device during the processing shown in FIG. 8. The denial method that was used is stored in storage location 1002. A determination is made as to whether the denial method that was used was a hot unplug of the device (decision 1010). If a hot unplug of the device was used, then decision 1010 branches to "yes" branch 1012 whereupon, at step 1015, a hot plug-in of the device is initiated now that the device software update has been applied (e.g., a firmware update, a device driver update, etc.). Processing then returns to the calling routing at 1020. On the other hand, if a hot unplug of the device was not the denial method that was used for the guest operating system, then decision 1010 branches to "no" branch 1022 whereupon a determination is made as to whether the guest operating system was forced to suspend (decision 1025). If the guest operating system was forced to suspend, then decision 1025 branches to "yes" branch 1028 whereupon, at step 1030, the suspended guest operating system is resumed and processing returns to the calling routine at 1035.

On the other hand, if the denial technique used was not a forced suspension of the guest operating system, then decision 1025 branches to "no" branch 1038 whereupon a determination is made as to whether the denial technique used was to stall the guest operating system by denying the guest operating system CPU cycles (decision 1040). If the guest operating system was stalled, then decision 1040 branches to "yes" branch 1042 whereupon, at step 1045, the guest operating system is reactivated by allowing the guest operating system to receive CPU cycles and processing returns to the calling routine at 1050.

On the other hand, if the denial technique was not to stall the guest operating system, then decision 1040 branches to "no" branch 1052 whereupon a determination is made as to whether the denial technique used was to cache requests made by the guest operating system to the device (decision 1055). If requests made by the guest operating system to the device have been cached, then decision 1055 branches to "yes" branch 1058 whereupon, at step 1060 the requests that were made by the guest operating system directed to the device and cached in buffer 885 are processed by sending the cached requests to the device (device 370). The processing of cached requests is performed until all of the cached requests have been sent to the device. At step 1065, after all of the cached requests have been processed, buffer 885 is deallocated and processing returns to the calling routine at 1070. Returning to decision 1055, if the denial technique was not to cache requests from the guest operating system to the device, then decision 1055 branches to "no" branch 1072 whereupon, at step 1075, the guest operating system's use of the device is resumed using some other technique that corresponds with the denial technique that was used to deny the guest operating system access to the device. Processing thereafter returns to the calling routine at 1080.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   identifying, by a first guest operating system running on a computer system, a device software update corresponding to a device attached to the computer system, wherein a virtualized environment exists on the computer system to support a plurality of operating systems, including the first guest operating system and a privileged operating system, using a hypervisor;
   notifying, via the hypervisor, the privileged operating system that is also running on the computer system of the identified device software update;
   in response to the notifying, the privileged operating system performs the following:
      denying one or more guest operating systems, which includes the first guest operating system, access to the device;
      continuing execution of the one or more guest operating systems for a duration that the one or more guest operating systems are executing and denied access to the device;
      validating a connection with the first operating system;

in response to successfully validating the connection, transferring control to the first guest operating system, whereupon the first guest operating system responds by storing a front end driver and transferring control back to the privileged operating system along with a driver update handle;

in response to receiving the driver update handle, the privileged operating system performs the following:
validating the driver software update; and
disabling the device;

updating device software used to operate the device using the identified device software update while the one or more guest operating systems are denied access to the device, wherein, in response to the updating, an updated back-end driver corresponds to the stored front-end driver; and resuming access between the one or more guest operating systems and the device in response to the updating.

2. The method of claim 1 further comprising:
verifying, by the privileged operating system, legitimacy of the identified device software update, wherein the updating is only performed in response to a successful verification.

3. The method of claim 2 wherein the verifying further comprises comparing a digital signature of the device software update with a pre-established digital signature.

4. The method of claim 1 wherein the denying further comprises:
identifying one or more guest operating system denial methods that correspond to each of the guest operating systems;
initiating a hot unplug of the device in response to at least one of the identified denial methods;
forcing a suspension of at least one of the guest operating systems in response to at least one of the denial methods;
stalling at least one of the guest operating systems in response to at least one of the denial methods; and
caching requests to the device from at least one of the guest operating systems in response to at least one of the denial methods.

5. The method of claim 1 further comprising:
taking the device offline in response to the denying; and
restarting the device prior to the resuming.

6. The method of claim 1 wherein the privileged operating system is the hypervisor that is running on the computer system and wherein the device software is selected from the group consisting of a device firmware and a device driver.

7. The method of claim 1 further comprising:
downloading, using the first guest operating system, the device software update from a second computer system that is connected to the computer system using a computer network, the downloaded device software update stored in a device software storage area accessible by the first guest operating system; and
executing the device software update by the first guest operating system; and
transferring control to the privileged operating system when the executing device software update attempts to update the device software.

8. An information handling system comprising:
one or more processors;
a memory accessible by at least one of the processors;
a nonvolatile storage area accessible by at least one of the processors;
a hardware device accessible by at least one of the processors, wherein the hardware device includes device software that controls the hardware device's operation;
a hypervisor that provides a virtualized environment that supports one or more guest operating systems and a privileged operating system, the hypervisor, guest operating systems, and privileged operating system each stored in the memory and the nonvolatile storage area and executed by the processors;
one or more sets of instructions executed by one or more of the processors in order to perform actions of:
identifying, by a first guest operating system, a device software update corresponding to the hardware device;
notifying the privileged operating system, via the hypervisor, of the identified device software update;
in response to the notifying, the instructions executing the privileged operating system perform additional actions of:
denying one or more guest operating systems, which includes the first guest operating system, access to the hardware device;
continuing execution of the one or more guest operating systems for a duration that the one or more guest operating systems are executing and denied access to the device;
validating a connection with the first operating system;
in response to successfully validating the connection, transferring control to the first quest operating system, whereupon the first guest operating system responds by storing a front end driver and transferring control back to the privileged operating system along with a driver update handle;
in response to receiving the driver update handle, the privileged operating system performs the following:
validating the driver software update; and
disabling the device;
updating device software used to operate the device using the identified device software update while the one or more guest operating systems are denied access to the device, wherein, in response to the updating, an updated back-end driver corresponds to the stored front-end driver; and
resuming access between the one or more guest operating systems and the device in response to the updating.

9. The information handling system of claim 8, wherein at least one of the sets of instructions causes the processors to perform further actions comprising:
verifying, by the privileged operating system, legitimacy of the identified device software update, wherein the updating is only performed in response to a successful verification.

10. The information handling system of claim 9 wherein the action of verifying further comprises an action of comparing a digital signature of the device software update with a pre-established digital signature.

11. The information handling system of claim 8 wherein the action of denying further comprises actions of:
identifying one or more guest operating system denial methods that correspond to each of the guest operating systems;
initiating a hot unplug of the hardware device in response to at least one of the identified denial methods;

forcing a suspension of at least one of the guest operating systems in response to at least one of the denial methods;
stalling at least one of the guest operating systems in response to at least one of the denial methods; and
caching requests to the hardware device from at least one of the guest operating systems in response to at least one of the denial methods.

12. The information handling system of claim 8, wherein at least one of the sets of instructions causes the processors to perform further actions comprising:
taking the hardware device offline in response to the denying; and
restarting the hardware device prior to the resuming.

13. The information handling system of claim 8 wherein the privileged operating system is the hypervisor that is running on the information handling system and wherein the device software is selected from the group consisting of a device firmware and a device driver.

14. The information handling system of claim 8 further comprising:
a network adapter that connects the information handling system to a computer network, wherein at least one of the sets of instructions causes the processors to perform further actions comprising:
downloading, using the first guest operating system, the device software update from a second computer system that is connected to the information handling system via the computer network, the downloaded device software update stored in a device software storage area accessible by the first guest operating system;
executing the device software update by the first guest operating system; and
transferring control to the privileged operating system when the executing device software update attempts to update the device software.

15. A computer program product stored in a computer memory device, comprising functional descriptive material that, when executed by an information handling system, causes the information handling system to perform actions that include:
identifying, by a first guest operating system running on a computer system, a device software update corresponding to a device attached to the computer system, wherein a virtualized environment exists on the computer system to support a plurality of operating systems, including the first guest operating system and a privileged operating system, using a hypervisor;
notifying, via the hypervisor, the privileged operating system that is also running on the computer system of the identified device software update;
in response to the notifying, the privileged operating system performs the following:
denying one or more guest operating systems, which includes the first guest operating system, access to the device;
continuing execution of the one or more guest operating systems for a duration that the one or more guest operating systems are executing and denied access to the device;
validating a connection with the first operating system;
in response to successfully validating the connection, transferring control to the first guest operating system, whereupon the first guest operating system responds by storing a front end driver and transferring control back to the privileged operating system along with a driver update handle;
in response to receiving the driver update handle, the privileged operating system performs the following: validating the driver software update; and disabling the device;
updating device software used to operate the device using the identified device software update while the one or more guest operating systems are denied access to the device, wherein, in response to the updating, an updated back-end driver corresponds to the stored front-end driver; and
resuming access between the one or more guest operating systems and the device in response to the updating.

16. The computer program product of claim 15 further comprising functional descriptive material that causes the data processing system to perform additional actions that include:
verifying, by the privileged operating system, legitimacy of the identified device software update, wherein the updating is only performed in response to a successful verification, wherein the verifying further comprises comparing a digital signature of the device software update with a pre-established digital signature.

17. The computer program product of claim 15 wherein the denying further comprises functional descriptive material that causes the data processing system to perform additional actions that include:
identifying one or more guest operating system denial methods that correspond to each of the guest operating systems;
initiating a hot unplug of the device in response to at least one of the identified denial methods;
forcing a suspension of at least one of the guest operating systems in response to at least one of the denial methods;
stalling at least one of the guest operating systems in response to at least one of the denial methods; and
caching requests to the device from at least one of the guest operating systems in response to at least one of the denial methods.

18. The computer program product of claim 15 further comprising functional descriptive material that causes the data processing system to perform additional actions that include:
taking the device offline in response to the denying; and
restarting the device prior to the resuming.

19. The computer program product of claim 15 wherein the privileged operating system is the hypervisor that is running on the computer system and wherein the device software is selected from the group consisting of a device firmware and a device driver.

20. The computer program product of claim 15 further comprising functional descriptive material that causes the data processing system to perform additional actions that include:
downloading, using the first guest operating system, the device software update from a second computer system that is connected to the computer system using a computer network, the downloaded device software update stored in a device software storage area accessible by the first guest operating system;
executing the device software update by the first guest operating system; and
transferring control to the privileged operating system when the executing device software update attempts to update the device software.

\* \* \* \* \*